3,403,977
METHOD FOR PRODUCTION OF TITANIUM DIOXIDE GRANULES
Kenneth W. Heywood, Overland, and Charles R. Trampier, Jr., Webster Groves, Mo., assignors to National Lead Company, New York, N.Y., a corporation of New Jersey
No Drawing. Filed June 25, 1964, Ser. No. 378,044
3 Claims. (Cl. 23—202)

ABSTRACT OF THE DISCLOSURE

This invention covers the preparation of a nonpigmentary titanium dioxide granular material having a Tyler screen size range from −10 mesh to +400 mesh, with at least 75% +325 mesh, the granular material made up of individual particles of $TiO_2$ having a size from 0.07 to 0.1 micron. Such a material is free-flowing and is capable of being handled without dusting.

---

Such a material is prepared by the process of the instant invention which comprises hydrolyzing a titanium sulfate solution at relatively low titanium concentration and at relatively low temperatures, calcining the hydrate and subdividing the calcined product to form $TiO_2$ granules of the type described above.

This invention relates in general to the production of titanium dioxide. More specifically it relates to an improved type of nonpigmentary titanium dioxide in the form of granules useful in the glass industry.

Titanium dioxide is most commonly known and widely used as a pigment for paints, and as such is generally produced commercially by the so-called "sulfate process" in which a titaniferous material is digested at elevated temperatures with concentrated sulfuric acid to form a porous cake which is dissolved in water or weak acid, with agitation, to form a solution of titanium and iron sulfates. The ferric sulfate values in the solution are converted to ferrous sulfate by the addition of scrap iron. The solution is then clarified to remove, by settling and filtration, essentially all of the solid materials contained in the solution with minimum loss of $TiO_2$.

Following clarification the ferrous iron values in the solution are crystallized to form copperas which is removed from the solution by filtration. The filtrate is then concentrated to remove excess water, both steps being necessary to prepare the solution for hydrolysis.

Concentration, as practiced in the prior art, is continued until the specific gravity of the solution is at least 1.6 with a $TiO_2$ content of at least 220 grams per liter and preferably from 225–275 grams per liter. The concentrated titanium sulfate solution is then converted, by hydrolysis, from the soluble state into insoluble titanium hydrate. Thus a predetermined amount of concentrated solution having a $TiO_2$ content of at least 220 grams per liter is preheated to a temperature of at least 90° C. and added at a predetermined rate, with agitation, to water at substantially the same temperature and in the ratio of 3–19 parts solution to one part water. During subsequent boiling, the precipitated insoluble $TiO_2$ forms initially as colloidal particles, which subsequently flocculate to produce a filterable $TiO_2$ hydrate containing from 30% to 36% solids.

In order to meet the high standards set for commercial grades of pigment, usually nuclei are employed which may be formed in situ during hydrolysis or produced separately and added to the titanium sulfate solution prior to hydrolysis. Following precipitation the hydrate is filtered, washed and bleached to remove impurities, and then given precalcination treatments, calcined and finished according to techniques well known in the art.

The finished titanium dioxide pigment of the prior art, sometimes referred to hereinafter as pigmentary $TiO_2$, will have a particle size range of from 0.1 to 1.0 micron with most of the particles being from 0.15 to 0.35 and as such is especially useful in paint formulations.

It has been found however that when a pigmentary $TiO_2$ is added to a batch of molten glass, for purposes of opacifying the glass or otherwise enhancing its properties or appearance, the pigmentary $TiO_2$, because of its inherent stickiness and relatively fine particle size, tends to form large flocs in the molten glass batch which do not melt properly. In fact in most cases substantially all of the titanium dioxide added to the glass batch sinks to the bottom of the vessel and remains as a sintered and unreacted sludge in the glass melt.

Attempts have been made to overcome this tendency of pigmentary $TiO_2$ to floc in a glass melt by using a coarser grade of titanium dioxide; and while some of the coarser grades have been used successfully in ceramic frits, these coarser grades of $TiO_2$ have been found to dust so severely, when introduced into a molten glass batch, as to be uneconomical in the glass industry.

An object of the instant invention therefore is to produce a nonpigmentary, free-flowing titanium dioxide material which can be added to a molten glass batch without dusting and without settling to the bottom of the glass batch. A further object is to produce titanium dioxide granules which melt rapidly in and disperse uniformly throughout a molten glass batch. These and other objects will become more apparent from the following more complete description of the instant invention.

Broadly, this invention contemplates a nonpigmentary titanium dioxide granular material capable of melting rapidly in a molten glass batch without dusting or settling, said granular material having a Tyler screen size range from −10 mesh to +400 mesh, with at least 75% +325 mesh, said granular material consisting essentially of aggregated titanium dioxide particles, said particles having an individual size range from about 0.05 to 0.15 micron most of which are from 0.07 to 0.1 micron, said material having a bulk density which falls within the range of 0.8 to 1.7 grams per cubic centimeter, said material being free-flowing and capable of being handled without dusting.

This invention further contemplates producing said nonpigmentary titanium dioxide granular material by calcining, at a temperature from 800° C. to 1000° C., a titanium hydrate produced by hydrolyzing a titanium sulfate solution of relatively low titanium concentration at relatively low temperatures, to form, upon calcination, nodules of aggregated titanium dioxide particles; and subdividing said nodules into granules having a particle size which falls within the range of −10 mesh to +400 mesh, with at least 75% +325 mesh, said granules being free-flowing. These granules comprise aggregated particles of $TiO_2$, the individual particles of $TiO_2$ having a size which falls within the range of 0.05 to 0.15 micron.

It has been discovered that $TiO_2$ granules having these characteristics can be incorporated into a molten glass batch composition without dusting and without sludging; and further, that the $TiO_2$ granules melt rapidly and disperse thoroughly throughout said molten glass composition.

This invention further contemplates a novel process for producing these free-flowing, nondusting, nonpigmentary titanium dioxide granules which comprises the following steps:

(1) Digesting a titaniferous material in concentrated sulfuric acid to form a digestion cake, (2) Dissolving said cake in aqueous media,
(3) Reducing the iron values to the ferrous state,
(4) Clarifying said solution to obtain a titanium sulfate-iron sulfate solution having a concentration falling within the range of 100–180 g.p.l. titanium, calculated as $TiO_2$.
(5) Heating water for hydrolysis to at least 80° C., the volume of said water substantially equal to 10% to 100% of the amount of solution to be used.
(6) Adding the titanium solution at a temperature from 40–80° C. to the heated water with agitation over a period of 15–50 minutes and maintaining the temperature of the hydrolysis mixture from 60–80° C. during the addition period,
(7) Heating the hydrolysis mixture to boil over a period of from 15 to 75 minutes,
(8) Boiling for about 1–3 hours to form a rapid settling titanium hydrate,
(9) Filtering, washing, bleaching and then calcining at 800–1000° C. to form nodules of aggregated titanium dioxide particles, and
(10) Subdividing said nodules to form granules which pass through a 10 mesh screen and are retained on a 400 mesh screen, with at least 75% being +325 mesh.

In carrying out the instant invention, substantially any type of titaniferous material may be used. The ore or concentrate employed is digested with concentrated sulfuric acid in the manner currently employed in the industry. The titaniferous material is heated at elevated temperatures in the presence of concentrated sulfuric acid to digest the titaniferous material and form therefrom a porous digestion cake containing titanium and iron sulfates. After curing, the cake is dissolved in an aqueous media such as water or weak acid to form a solution of iron and titanium sulfates.

As the digestion cake is dissolved, scrap iron is added to the solution to reduce the ferric iron values to ferrous sulfate. The solution is then clarified in the usual manner to remove slimes and insoluble material. In accordance with the novel features of this invention the clarified solution should have titanium concentration of from 100 to 180 g.p.l. calculated as $TiO_2$ and an $H_2SO_4/TiO_2$ ration from 1.7 to 2.3.

At this stage, i.e., without crystallization or further concentration the clarified solution is ready for hydrolysis. It should be noted that the concentration of the titanium values is realtively low, i.e., from 100 to 180 g.p.l. titanium as $TiO_2$, which is far below the titanium concentration used today in the commercial production of pigments which is at least 220 g.p.l. $TiO_2$. Moreover, since the hydrolysis step is carried out with solutions at these low concentrations, crystallization of the iron values is not required. The process of the instant invention therefore eliminates both the crystallization step and the subsequent concentration step required in normal $TiO_2$ pigment production methods.

The solution containing from 100 to 180 g.p.l. titanium, calculated as $TiO_2$, and having an $H_2SO_4/TiO_2$ ratio between 1.7 and 2.3 is then hydrolyzed under novel controlled conditions to produce a titanium hydrate suitable for the production of the nonpigmentary $TiO_2$ of this invention. This may be accomplished by a variety of methods, three of which are described briefly as follows:

(1) The solution is heated to 40–80° C. and added with agitation to water in the amount from 10% to 100% of the amount of solution used, the water being heated to at least 80° C. over a period of from 15 to 50 minutes, the temperature of the hydrolysis mixture being allow to drop to 60° C. to 80° C. or maintained within this temperature range during the addition period. The mixture is then heated to boil and boiled for 1–3 hours.

(2) The solution is heated to 40–80° C. and a separately prepared nuclei is added to the solution and the solution is heated to boil over a period of 15–75 minutes and boiled for 1–3 hours.

(3) The procedure described in (1) above is utilized except that only 75% to 90% of the titanium sulfate solution is added to the water during the addition period, the remaining 10% to 25% of the solution being added after the hydrolysis mixture has been brought to boiling temperature and boiled for from 10 minutes to 150 minutes. After the remaining solution has been added, the entire mixture is then boiled for from 1 hour to 3 hours to complete the hydrolysis.

Certain advantages may be realized when process (3) is employed since the hydrate formed tends to settle faster and filter more rapidly than the hydrate produced by the other two methods (1) and (2). These advantages may be of particular value when it is desired to handle large quantities of hydrate.

The titanium hydrate obtained by any of these processes is filtered, washed, bleached. The titanium hydrate so obtained is then calcined at 800–1000° C. to form nodules of aggregated $TiO_2$. The nodules are then broken up into granules which pass a 10 mesh screen but are retained on a 400 mesh screen with at least 75% being +325 mesh.

The granular titanium dioxide material produced is subjected to various tests in order to determine some of its physical properties. These tests are described as follows:

DUSTING TEST 100 grams of the granular material were placed in a 24 inch glass tube having an I.D. of $^{13}/_{16}$ inch and having a 7.5 cm. Buchner funnel at one end to act as an air dispenser. The tube should be held at 30° angle to keep the granular material out of the Buchner funnel as it is being added to the tube. Air at the rate of 1.0±0.02 cu. ft./min. is passed through the tube while held in a vertical position for 5 minutes after which the granular material is collected and weighed. The weight loss calculated in percentage is recorded as the loss due to dusting. It has been found that the granular material of the instant invention has a dust loss of less than 7%.

FREE-FLOWING TEST

The titanium dioxide granular material is placed in a glass funnel and the material is allowed to pour through the funnel within a certain time period if it is considered to be free-flowing. In this particular test a glass funnel having a discharge opening of ⅝ inch, a top opening of 4⅞ inches, a 3 inch cone height, a 60° cone, and 1 inch stem was used. Sufficient granular material was added to fill the cone (about 175 grams). The opening of the funnel was closed as the funnel was filled. Upon opening the discharge end of the funnel, the time was measured for the funnel to become emptied. The interval of time is recorded as the amount of free flow that the granular material possessed. In most cases the material flowed through the funnel within less than 6 seconds.

BULK DENSITY

A 10 mesh scren is placed on top of a 8 inch diameter, 60° cone funnel having a $^5/_{16}$ inch discharge opening. A 50 ml. cup was placed at the tip of the funnel discharge opening. The $TiO_2$ sample was then brushed through the screen which passed through the funnel and into the cup. The cup was filled to overflowing, leveled off with a spatula and the contents of the cup weighed.

In order to further describe the instant invention, the following examples are presented:

EXAMPLE I

A titanium sulfate-ferrous sulfate solution was prepared in the usual manner by reacting an ilmenite ore ground to −200 mesh with concentrated sulfuric acid to produce a digestion cake which was dissolved in weak sulfuric acid, scrap iron was added to the solution to reduce the ferric iron values to ferrous iron. The solution was then clarified to remove slimes and insoluble materials. The clarified solution had the following analysis:

| | |
|---|---|
| Specific gravity, ° C. | 1.530 at 60 |
| Total $TiO_2$ percent (132 g.p.l.) | 8.77 |
| $Ti^{+++}$ as $TiO_2$, g.p.l. | 1.5 |
| Active $H_2SO_4$, percent | 16.9 |
| $FeSO_4$, percent | 19.7 |
| $H_2SO_4/TiO_2$ ratio | 1.93 |

The titanium values in solution were then hydrolyzed at the above concentration without crystallizing any of the ferrous sulfate values from the solution. To this end 1250 parts of water were placed in a precipitation tank and were heated to 95° C. 2500 parts of the titanium sulfate-ferrous sulfate solution previously heated to 55° C. were added to the hot water under agitation over a period of 30 minutes. The temperature of the hydrolysis was allowed to fall to about 70° C. and maintain at 70° C. during the addition period. The temperature of the mixture was then increased to a boil within 30 minutes and the mixture was boiled for 3 hours to hydrolyze the titanium values. The batch was then diluted with 5600 parts of hot water and the hydrolyzed titanium values were recovered as a hydrate by filtration and thorough washing. A recovery of 95% of the titanium values was obtained. The washed hydrate was bleached, washed, dewatered and calcined to a temperature of 875° C. in a rotary furnace. No dusting occurred in the calciner during the calcining operation. The calcined product consisted of nodules ½ to 1/16 inch in diameter. These nodules were passed rapidly through a hammer mill (with no screen) to subdivide these nodules into granules of a size such that they passed through a 10 mesh screen but were retained on a 400 mesh screen with 91% +325 mesh. These granules had the following Tyler screen analysis:

| | Percent |
|---|---|
| −10 mesh +20 mesh | 6.1 |
| −20 mesh +40 mesh | 18.8 |
| −40 mesh +60 mesh | 16.9 |
| −60 mesh +80 mesh | 15.8 |
| −80 mesh +100 mesh | 7.7 |
| −100 mesh +325 mesh | 25.7 |
| −325 mesh +400 mesh | 9.0 |
| | 100 |

The size of the individual particles in the granules were 0.05 micron to 0.15 micron with most of the particles being from 0.07 to 0.1 micron as determined by an electron photomicrograph. The bulk density of the granular material was 1.4 grams per cubic centimeter. The dust loss was 2.3% and the material had a free flow of 5 seconds. It should also be noted that the nodules were hard enough to withstand micropulverizing (without a screen) without producing −400 mesh material.

EXAMPLE I-A

In order to show the effectiveness of the instant invention in a molten glass batch; 4.0 parts of the titanium dioxide granules were admixed by dry blending with a plate glass composition comprising 68.7 parts of $SiO_2$, 0.5 part of $Al_2O_3$, 23.1 parts of $CaCO_3$, 13.7 parts of $NaNO_3$, 14.0 parts of $Na_2CO_3$ and 1.0 part of $As_2O_3$. This plate glass composition, containing the free-flowing, nondusting $TiO_2$ granules, was melted at 1500°C. and held at 1500° C. for 1 hour. All of the ingredients melted rapidly and a homogeneous glass mixture was obtained. None of the $TiO_2$ added was lost through dusting or sludging.

EXAMPLE I-B

Another type of glass was prepared using the $TiO_2$ granules of the instant invention. This particular glass composition had the following ingredients: 56 parts $SiO_2$, $Al_2O_3$, 31.4 parts of $MgCO_3$ and 9 parts of $TiO_2$ granules. The molten glass batch was prepared in the same manner as that described in Example I-A above and again excellent results were obtained. The $TiO_2$ granules melted rapidly in the molten glass batch and no dusting or sludging occurred.

Example I-C

For comparative purposes regular pigment grade $TiO_2$ was used in the glass composition of Example I-A instead of the $TiO_2$ granules of the instant invention. The regular pigment grade $TiO_2$ formed large agglomerates in the glass batch and settled to the bottom of the glass smelter. Only 30% of the $TiO_2$ added dissolved; the remaining 70% formed an insoluble sludge in the bottom of the smelter and was lost from the glass batch.

Example II

This example illustrates a modification of the method of hydrolyzing the titanium sulfate-ferrous sulfate solution as disclosed in Example I, in which a separately prepared nucleus was used.

The nucleus employed was prepared as follows: 200 parts of water were heated to 100° C. and to the water were added 600 parts of titanium sulfate-ferrous sulfate solution heated to 50° C. over a period of 13–17 minutes with agitation and held at 75° C. to produce a colloidal solution.

1200 parts of the titanium sulfate-ferrous sulfate solution described in Example I and containing 132 grams of $TiO_2$ per liter were heated to 55° C. and to this solution were added with agitation 800 parts of the externally prepared nuclei. The mixture was heated to boiling over a period of 60 minutes and boiled for 3 hours to hydrolyze the titanium values. The titanium hydrate produced was washed, bleached, dewatered and calcined in the manner described in Example I. The calcined nodules produced had substantially the same physical characteristics as those described above. These nodules were then passed through a hammer mill without a screen and the granules produced were similar to those obtained in Example I. Again the granules had a screen size within the range of −10 mesh +400 mesh with at least 75% +325 mesh. The size of the individual particles in the granules was 0.05 to 0.15 micron. The bulk density of the granules was 1.1 grams per cubic centimeter. The free-flow was 5 seconds and the dust loss was 4.5%. These granules were also added to molten glass batches, such as described in Examples I-A and I-B, and again no dusting nor sludging of the $TiO_2$ granules occurred.

Example III

In this example the procedure of method (3) was employed in which 85% of the titanium solution was added at the outset and the remaining 15% was added after the hydrolysis mixture had boiled for 60 minutes.

Again the titanium sulfate-ferrous sulfate clarified solution described in Example I was used in this example.

1250 parts of water were placed in a precipitation tank and were heated to 95° C. 2125 parts of the titanium sulfate-ferrous sulfate solution previously heated to 55° C. were added to the hot water under agitation over a period of 26 minutes. This amount was 85% of the total amount of solution to be added. The temperature of the hydrolysis was allowed to fall to about 70° C. and maintained at 70° C. during the addition period. The temperature of the mixture was then increased to a boil within 35 minutes and the mixture was boiled for 1 hour to hydrolyze the titanium values. 375 parts of the remaining titanium solution were then added to the boiling mixture over a period of 5 minutes and then the whole mixture was boiled for an additional 2 hours to complete the hydrolysis. The batch was then diluted with 5600 parts of hot water and the hydrolyzed titanium values were recovered as a hydrate by settling, filtering and thorough washing. A recovery of 95% was obtained. It should be pointed out that the settling rate of the hydrate was 15 cm./hr., the deliquoring rate was 140 seconds and the washing rate was 135 seconds. These rates are considerably better than the corresponding rates obtained in Example I which were 9 cm./hr., 220 seconds and 325 seconds respectively.

The settling rate was determined by adding 200 parts of hydrate slurry to 300 parts of water and allowing the mixture to stand at room temperature. The supernatant liquid was measured in centimeters after 1 hour.

The deliquoring rate was measured by pouring 100 ml. of the hydrate slurry at 50° C. into a 5.5 cm. Buchner funnel using two No. 55 Whatman filter papers at 18 inch Hg vacuum. The time in seconds to deliquor the slurry was recorded.

The washing rate was measured in seconds by passing 100 ml. of water at 50° C. onto the deliquored filter cake under the same conditions.

The washed hydrate was bleached, washed, dewatered and calcined to a temperature of 925° C. in a rotary furnace. No dusting occurred in the calciner during the calcining operation. The calcined product consisted of nodules ½ to $\frac{1}{16}$ inch in diameter. These nodules were passed rapidly through a hammer mill (with no screen) to subdivide these nodules into granules of a size such that they passed through a 20 mesh screen but which were retained on a 400 mesh screen with 90% +325 mesh. These granules had a Tyler screen analysis similar to that described in Example I.

The size of the individual particles in the granules were again similar to that described in Example I. The bulk density of the granular material was 1.3 grams per cubic centimeter. The dust loss was 2.7% and the material had a free flow of 6 seconds. Again no sludging nor dusting was encountered when these granules were added to a glass batch.

From the above description and by the examples presented, it has clearly been shown that a new and novel type of titanium dioxide granular material has been produced by the process of the instant invention. This granular material is very different from titanium dioxide pigments produced commercially. The granular material of the instant invention melts uniformly and rapidly in a molten glass bath without settling or dusting while regular pigment forms flocs and settles to the bottom of the glass batch without melting.

The granular material of the instant invention is produced by a simple and economical process which does not require the titanium solution to be concentrated before hydrolysis. In addition the product does not have to be severely milled, as is necessary in normal pigment production processes, and further, the product is of such a character that even though it is severely milled, it will not not have pigmentary properties.

While this invention has been described and illustrated by the examples shown, it is not intended to be strictly limited thereto, and other variations and modifications may be employed within the scope of the following claims.

We claim:

1. A process for the preparation of a nonpigmentary titanium dioxide granular material, said granular material capable of being incorporated into a molten glass batch composition without dusting or settling in said composition, said process comprising:
digesting a titaniferous material in concentrated sulfuric acid to form a digestion cake, dissolving said cake in aqueous media, reducing the iron values to the ferrous state, clarifying said solution to obtain a titanium sulfate-ferrous sulfate solution having a titanium concentration within the range of 100 to 180 g.p.l. titanium, calculated as $TiO_2$ and an $H_2SO_4/TiO_2$ ratio of 1.7 to 2.3, adding said titanium solution heated to 40–80° C. to water heated to at least 80° C. with agitation over a period of 15–50 minutes, the volume of water employed being from 10% to 100% of the amount of solution used, holding the temperature of the mixture between 60–80° C. during the addition period, heating the mixture over a period of from 15 to 75 minutes until the mixture reaches boiling temperature, then boiling said mixture for about 1–3 hours to complete the hydrolysis of the titanium values and form an insoluble titanium hydrate, filtering, washing and bleaching said titanium hydrate, and calcining the bleached titanium hydrate at 800–1000° C. to form nodules of aggregated titanium dioxide particles, subdividing said nodules to form granules of $TiO_2$ of a size to pass through a 10 mesh screen but be retained on a 400 mesh screen, said granules comprising aggregated $TiO_2$ particles having individual particle sizes which fall within the range of 0.05 to 0.15 micron.

2. Method according to claim 1 in which the size of the nodules formed are from ½ to $\frac{1}{16}$ of an inch in diameter.

3. A process for the preparation of a non-pigmentary titanium dioxide granular material, said granular material capable of being incorporated into a molten glass batch composition without dusting or settling in said composition, said process comprising: digesting a titaniferous material in concentrated sulfuric acid to form a digestion cake, dissolving said cake in aqueous media, reducing the iron values to the ferrous state, clarifying said solution to obtain a titanium sulfate-ferrous sulfate solution having a titanium concentration within the range of 100 to 180 g.p.l. titanium, calculated as $TiO_2$ and an $$H_2SO_4/TiO_2$$

ratio of 1.7 to 2.3, adding from 75% to 90% of said titanium solution heated to 40–80° C. to water heated to at least 80° C. with agitation over a period of 15–50 minutes, the volume of water employed being from 10% to 100% of the total amount of solution to be employed, holding the temperature of the mixture between 60–80° C. during the addition period, heating the mixture over a period of from 15 to 75 minutes until the mixture reaches temperature, then boiling said mixture for about 10 to 150 minutes, adding the remaining 10% to 25% of the titanium solution to the hydrolysis mixture and boiling the whole for 1–3 hours to complete the hydrolysis of the titanium values and form an insoluble titanium hydrate, filtering, washing and bleaching said titanium hydrate, and calcining the bleached titanium hydrate at 800–1000° C. to form nodules of aggregated titanium dioxide particles, subdividing said nodules to form granules of $TiO_2$ of a size to pass through a 10 mesh screen but be retained on a 400 mesh screen, said granules comprising aggregated $TiO_2$ particles having individual particle sizes which fall within the range of 0.05 to 0.15 micron.

References Cited

UNITED STATES PATENTS

| 1,937,037 | 11/1933 | Hanahan | 23—202 |
| 2,089,180 | 8/1937 | Bousquet et al. | 23—202 |
| 2,293,861 | 8/1942 | Stark | 106—300 |
| 2,564,365 | 8/1951 | Kingsbury | 23—202 XR |
| 2,721,787 | 10/1955 | Hettrick | 23—202 |
| 2,999,011 | 9/1961 | Olmsted et al. | 23—202 |
| 3,062,673 | 11/1962 | Wigginton | 23—202 XR |
| 3,071,439 | 1/1963 | Solomka | 23—202 |
| 3,091,515 | 5/1963 | Dantro et al. | 23—202 |
| 3,211,528 | 10/1965 | Wigginton | 23—202 |

OSCAR R. VERTIZ, *Primary Examiner.*

E. STERN, *Assistant Examiner.*